Dec. 9, 1958   R. A. PETERSON   2,863,516
TRACK CONTROL MECHANISM FOR TRACTOR
Filed May 21, 1956   5 Sheets-Sheet 1

INVENTOR.
ROBERT A. PETERSON
BY
ATTORNEY

Dec. 9, 1958 R. A. PETERSON 2,863,516
TRACK CONTROL MECHANISM FOR TRACTOR
Filed May 21, 1956 5 Sheets-Sheet 2
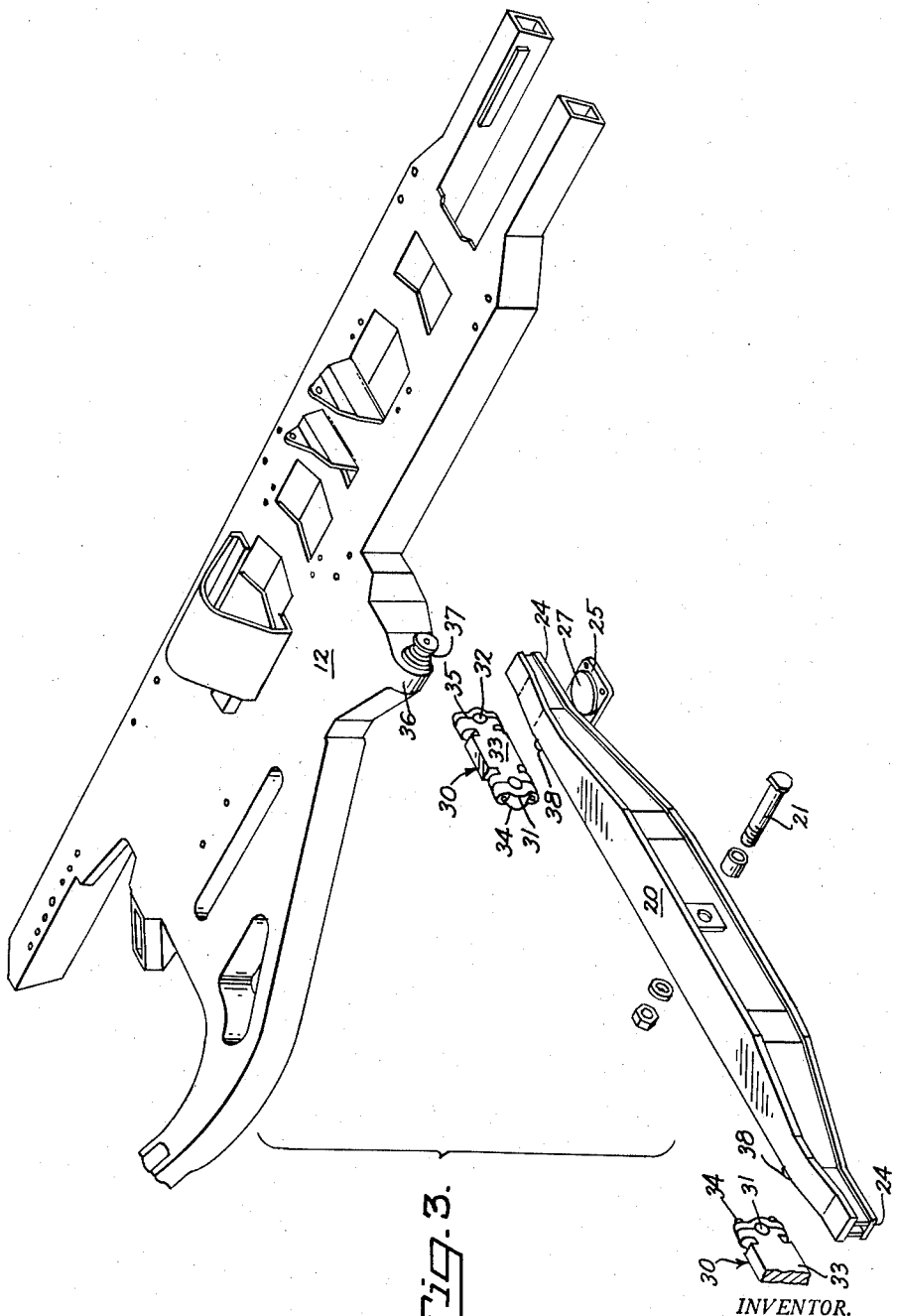
INVENTOR.
ROBERT A. PETERSON
BY
ATTORNEY

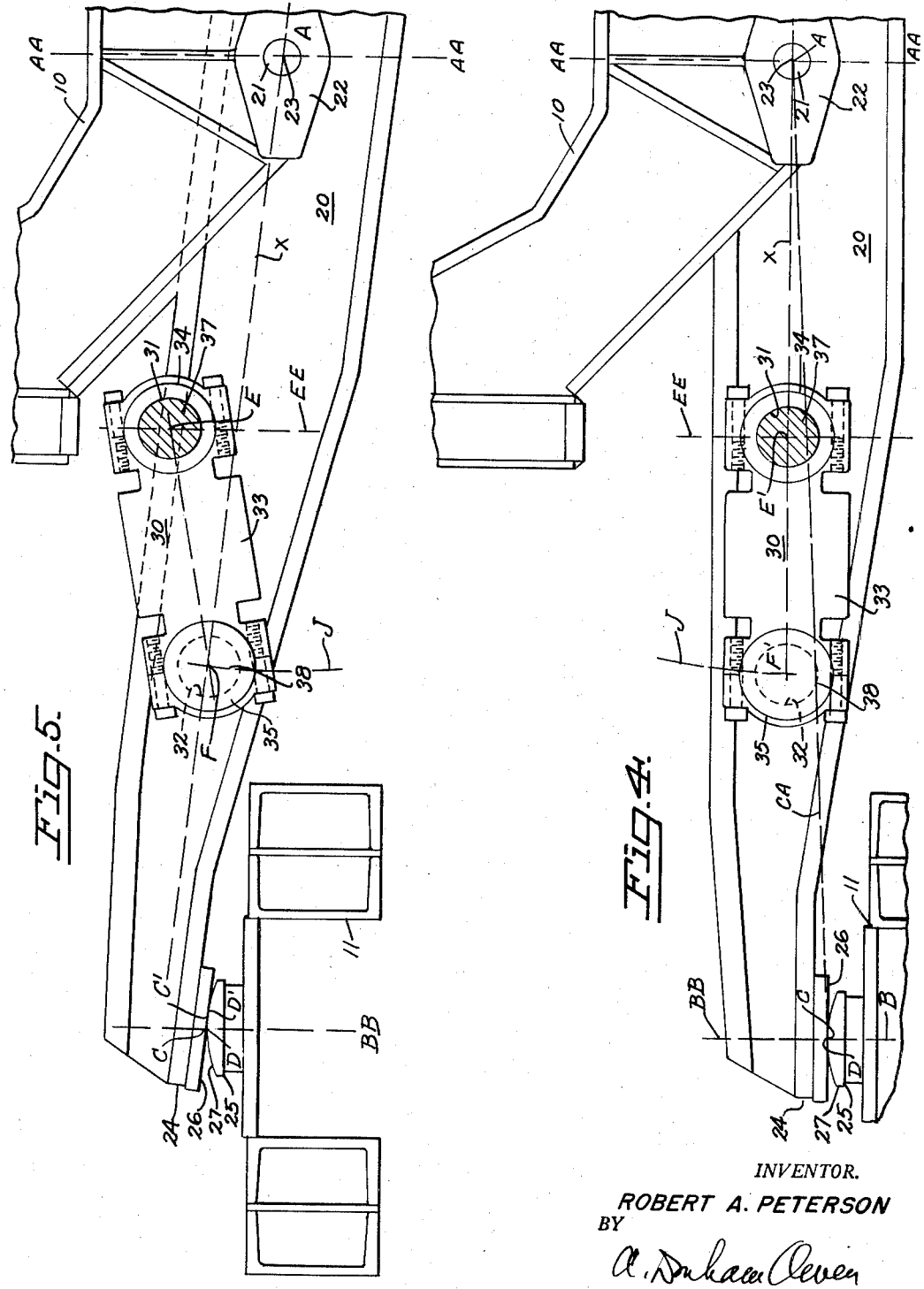

Dec. 9, 1958 R. A. PETERSON 2,863,516
TRACK CONTROL MECHANISM FOR TRACTOR
Filed May 21, 1956 5 Sheets-Sheet 4

INVENTOR.
ROBERT A. PETERSON
BY
ATTORNEY.

Dec. 9, 1958    R. A. PETERSON    2,863,516
TRACK CONTROL MECHANISM FOR TRACTOR
Filed May 21, 1956    5 Sheets-Sheet 5

INVENTOR.
ROBERT A. PETERSON
BY
ATTORNEY

United States Patent Office 2,863,516
Patented Dec. 9, 1958

2,863,516
TRACK CONTROL MECHANISM FOR TRACTOR
Robert A. Peterson, San Leandro, Calif.
Application May 21, 1956, Serial No. 586,064
7 Claims. (Cl. 180—9.1)

This invention relates to improvements in the pivotal mounting of the track frames to the main frame in a tractor of the track-laying type, and is especially applicable to large vehicles having long track frames with wide track shoes to give the low ground pressure required when operating in the arctic and antarctic regions on soft snow fields, and in other like conditions.

The invention also is applicable to what are sometimes known as twin tractors, especially where the two independent engine-driven chassis comprising the unitary vehicle are connected to each other by a bearing means extending normal to the fore and aft line of the vehicle and to the vertical plane in which each chassis is capable of independent movement. First, however, I shall describe my invention as applied to the track-laying type of tractor having a single chassis and two tracks.

The basic structural elements of the track-laying type of tractor include the main frame on which is mounted the engine, transmission, and operating controls, and the track frames extending fore and aft along each side of the main frame with provision on them for the track shoes to be moved along the frames. The track frames are pivotally connected at one end to a rugged axle extending outwardly from the transmission and drive housing on the main frame, and are thus able to move about said axle in a vertical plane parallel to a vertical plane passing through the fore-and-aft center line or axis of the main frame.

The other end of the main frame has been variously supported heretofore, either by leaf springs secured near the front of the main frame and extending sidewise into contact with pads on the adjacent track frames, or by other mechanical arrangements which will give a yielding support between that end of the main frame and the track frames as the latter rise and fall in moving over uneven terrain.

With the advent of very large tractors in the past 20 years a new problem arose, because of the increased distance that the track frames extended ahead of the axle by which they were pivoted to the main frame. Twisting moments were exerted on the axle by forces acting on the forward ends of the track frames, and these moments have caused bending of the axles and other serious damage to the drive mechanism. Various attempts at solving the problem have been made, but none heretofore has been fully satisfactory.

The problem is to get control of the track frame at each side of the tractor to keep the front end of each track frame from being sprung in or out, because if the frame is so sprung, it will bend the axle by which the track frames are secured to the main frame of the tractor.

Another way of stating the problem is to say that it involved discovering a mechanism to maintain two longitudinally extending frames in fixed vertical parallel planes of movement relative to each other, the frames being hinged to each other at one end by a horizontal pivot connection and being free to move vertically in relation to each other at their other end.

After long study of the problem I discovered that by using a drag link connection between each track frame and a stiff beam pivoted to the main frame and resting at its outer ends on pads on the track frames, a length of link could be found and a pivot point for the link could be located on the stiff beam which would allow the motion of the track frame, in rising or falling, and the motion of the stiff beam on the main frame to compensate for each other so that the track frame would move in a vertical plane parallel to a vertical plane passing through the pivotal connection of the stiff beam to the main frame.

Tests have shown that this solution to the problem results in a rugged structure that will maintain the desired parallel movement of the track frames under actual conditions of use.

This solution to the problem has many advantages over earlier attempts at its solution. These advantages include basic simplicity; ruggedness; freedom from servicing or replacement of parts; and location of the parts where they are out of the way and are not subject to injury from stones, dirt, and mud, etc., lying on the surface being traversed. There is no limit to the strength that can be achieved by this structure; so vehicles of a size not yet built can be cared for by my invention.

Another advantage is that my invention lends itself to application to many large tractors now in the field.

A further advantage of the invention is its ready adaptability to the manufacture of current types of tractors, since it adds few new parts and utilizes conventional structure without substantial alteration, save at a few critical points.

The principal objects of the invention are, then, to solve the above-described problems and to provide a tractor having the advantages just enumerated.

Another object of the invention is to provide a simple method for determining the locations of the critical pivot points and the critical length of the drag link connecting the stiff beam to each track frame, so that the desired vertical movement will result without substantial wear on the pivot points of the link.

Another object of the invention is to support the weight of one end of the tractor main frame on the track frames through a sliding connection that is not directly concerned with the maintenance of alignment between the main and track frames, this alignment being maintained by drag links that do not have to support the weight of the main frame.

Other objects and advantages of the invention will appear from the following description of a preferred form thereof in accordance with 35 USC 112.

In the drawings:

Fig. 3 is an exploded view of the stiff beam, one drag link and one track frame, with a portion of the other drag link being shown.

Fig. 4 is a view in elevation showing one half of the stiff beam and the relation of its center pivot to its rest pad, drag links, etc., the beam being shown in its normal horizontal position.

Fig. 5 is a view similar to Fig. 4, showing the beam in an inclined position at the point of maximum travel in one direction of the track frame relative to the main frame.

Figure 1:
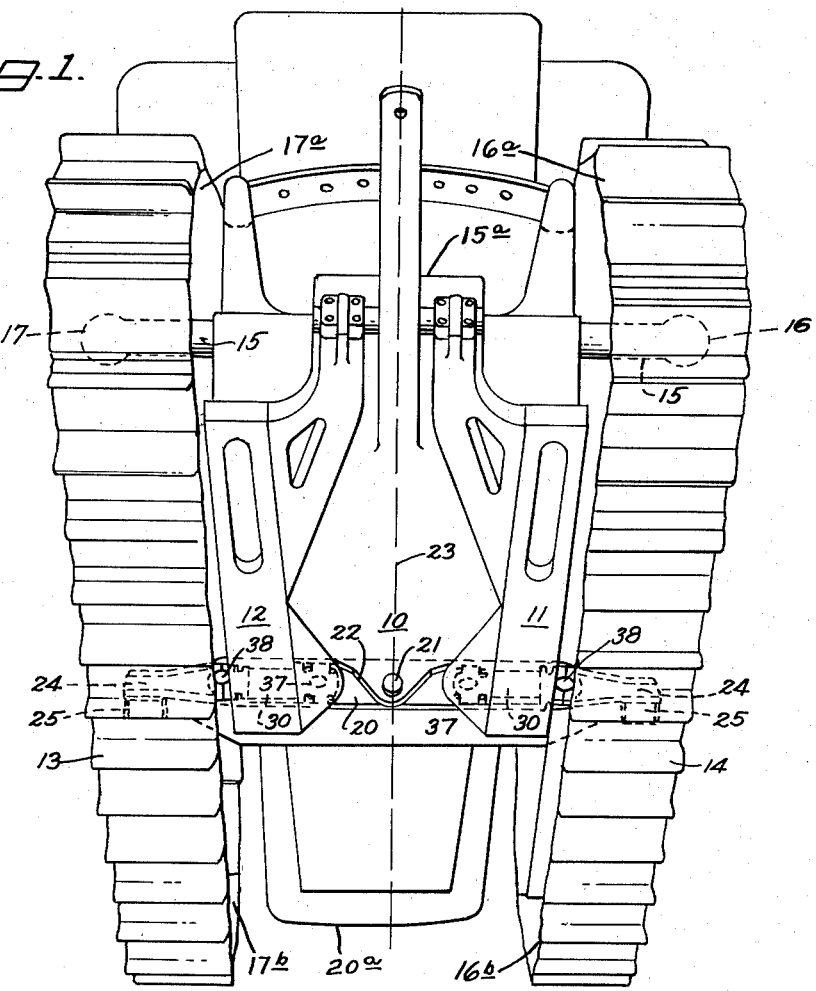
Fig. 1 is a view in perspective looking up at the bottom of a tractor from near the rear end thereof and showing a structure embodying the principles of my invention.

A detailed description of all the elements of the track-layer type of tractor to which this invention applies can be omitted as the man skilled in this art is well versed in its general make-up. The present invention is concerned with a few of its main parts, particularly with the relation of the main frame 10 (which supports the engine (not shown), transmission (not shown), and the controls), to the track frames 11 and 12 (which support the tracks 13 and 14 upon which the tractor moves and which also support the main frame 10 through an axle 15 (Fig. 1)). The axle 15 provides the pivotal connection of the track frames 11 and 12 to the main frame 10. Thus the track frames 11 and 12 are pivoted on the ends 16 and 17 of the axle 15 near one end 15ª of the main frame 10, so that each track frame 11 or 12 and its associated track 13 or 14 is free to swing in a vertical plane which should, as has already been pointed out, always be parallel to a vertical plane along the fore and aft center line of the main frame. The pivotal axle 15 also lies near ends 16ª and 17ª of the track frames 11 and 12, with the other ends 16ᵇ and 17ᵇ of the track frames free to rise and fall in a vertical plane parallel to a vertical plane passing through the longitudinal center line 23 of the main frame 10.

The present invention is predicated upon the necessity of maintaining this vertical alignment of the track frames 11 and 12 with the main frame 10, so that the tracks do swing parallel to the vertical plane passing through the longitudinal axis of the main frame 10. With the axle 15 the only linkage between the track frames 11 and 12 and the main frame 10, forces at the opposite end of the tractor would be able to place a substantial moment about the axle 15, and bend it. Prior to my invention the mechanisms employed to solve the problem were complicated, short-lived, and generally unsatisfactory.

My invention incorporates a stiff beam 20 pivotally connected to the main frame 10 by a pivot pin 21 that is secured to a bracket 22 on the center line or longitudinal axis 23 of the main frame 10. The stiff beam 20 is a heavy rigid structural member spaced from the axle 15 a distance sufficient to give the desired support to the other end 20ª of the main frame of the tractor. Its outer end portions 24, 24 rest on pads 25, 25 that are secured to or form part of the track frames 11 and 12. In other words, one function of the stiff beam 20 is to transmit the weight at one end 20ª of the main frame 10 to the track frames 11 and 12 and, through them, to the ground. Since the stiff beam 20 pivots at 21, it follows both frames 11 and 12 in their vertical movement opposite and relative to each other.

As shown in Figs. 4 and 5, the lower surface 26 of each outer end portion 24 is substantially planar, and the pad 25 preferably has a rounded upper surface 27, of a ball segment, so that when a track frame 11 or 12 moves up or down vertically (pivoting about the axle 15) and the stiff beam 20 is swung about its pivot 21 (thereby changing the distance between the pivot 21 and the rest pad 25), sliding contact is maintained between the bearing surfaces 26 and 27, enabling the swinging to take place.

Since the ends 24, 24 of the stiff beam 20 merely rest on the pads 25, 25, it was found some years ago that with long track frames additional connections must be provided between the track frames 11, 12 and the stiff beam 10 to give the needed support to the track frames. The present invention is based on a discovery that it could be accomplished by links of a certain length mounted at a certain point on the stiff beam. Because of the complexities of changing distances between the stiff beam, the main frame and the track frames caused by vertical movement of the track frames, I thought links could not be used and investigated other mechanisms before making the present discovery.

Each of the two identical drag links 30 is provided with bearing openings 31, 32 near its ends. In the preferred construction, half of each opening 31, 32 is provided by machining the drag link body 33 and the other half is provided by suitably shaped caps 34, 35 which are bolted to the body 33. Each track frame 11, 12 is provided with an extension 36 provided with a ball pivot member 37 that fits in the socket-shaped bearing opening 31, the ball shape taking up the small amount of rotational fore-and-aft movement about the axle 15 that accompanies the otherwise generally vertical movement of the track frames 11 and 12. A ball shaped bearing member 38 secured to the stiff beam 20 engages the bearing opening 32. Thus the drag links 30 join the stiff beam 20 to the frames 11 and 12 and act to provide the necessary alignment for insuring true vertical movement of the frames 11 and 12 relative to the frame 10 and prevent the exertion of disruptive moments on the axle 15.

Figure 2:
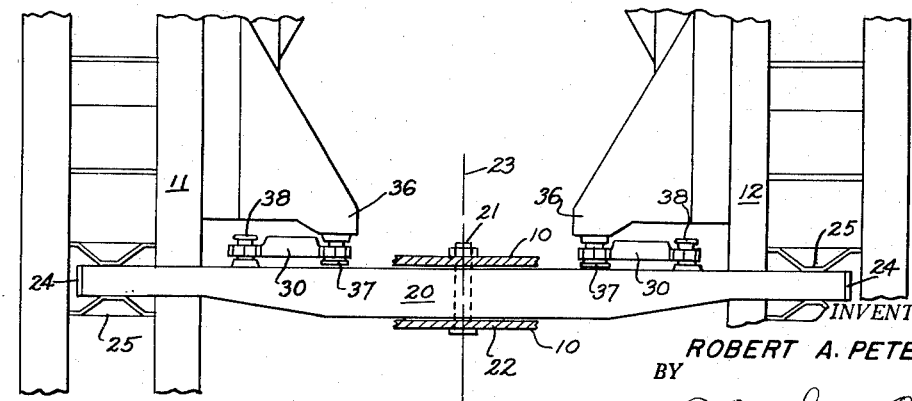
Fig. 2 is a fragmentary top plan view of the stiff beam, portions of the track frame, and the drag links that maintain the alignment between the stiff beam and track frames, but omitting for the sake of clarity most of the main frame (except for a small portion shown in section) and other parts of the track frame.

The location of the bearing member 38 on the stiff beam 20 and the length of the drag link 30 are the difficult matters to determine. I find it is best to have the bearing member 37 on the track frames 11 and 12 as close in to the main frame as possible. As shown in Fig. 2, an extension 36 is secured to the inside of each track frame for the purpose of bringing the pivot 37 in close to the main frame. I start with this point 37 thus selected as my given point. It must lie between the center line 23 of the tractor and the pivot point 38 whose location is yet to be determined. The location of this point 38 will give the length of each drag link 30, because the latter will connect the pivot points 37 and 38.

*Selecting the pivot point on the stiff beam*

Figure 6:
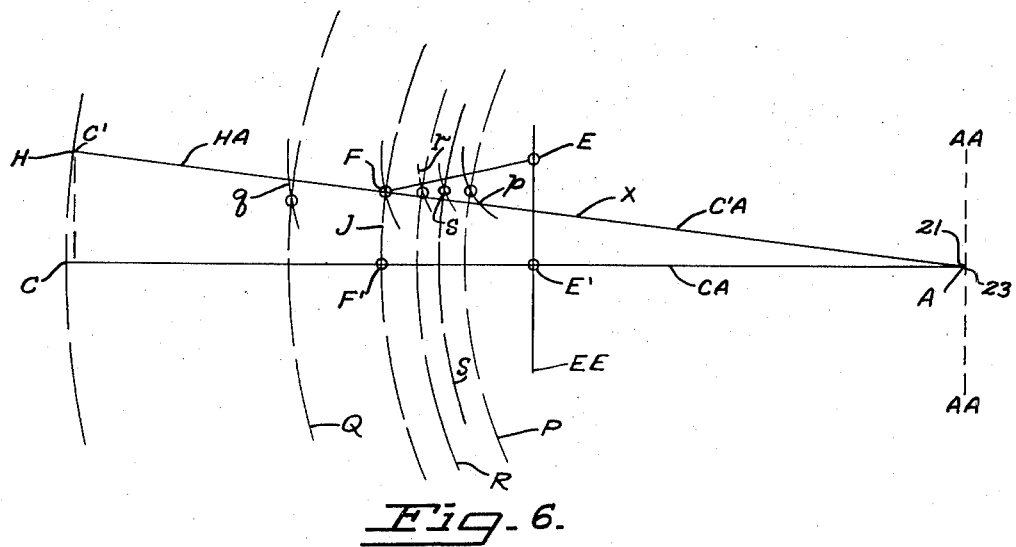
Fig. 6 is a diagrammatic view illustrating how the location of the pivot point and the length of the drag link are determined.

The complex and elusive nature of my solution to the problem will be appreciated from the diagrammatic drawings in Figs. 4–6. Here the center line or axis of the main frame 10 and the pivot point of the stiff beam 20 is marked A and the vertical plane passing through it is indicated by the vertical dash line marked AA. The center of one track frame 11 is marked B and the vertical plane passing through it is indicated by the vertical dash line marked BB. The problem is to keep the track frame 11 and the main frame 10, which are pivoted to each other by the axle 15, in these planes when they move around that pivot point.

The point C on the stiff beam pad 26 bears on the point D on the curved surface 27 of the pad 25 on the track frame 11. As shown in Fig. 4 the dash line CA connecting point C and point A makes almost a right angle with the plane AA, and it does make a right angle when the axis of the stiff beam 20 is horizontal as shown diagrammatically in Fig. 6. However, when the track frame 11 rises or falls in relation to the main frame 10, in going over rough terrain, the angle of the line CA to the plane AA will vary from more to less than a right angle. The point C on the stiff beam 20 will move to the position C' when the stiff beam is raised, for example, 6 inches by the track frame, and will engage the pad 25 at the point D' (see Fig. 5), whereas the point D on the pad 25 will be separated from it. If there were a pivotal connection between the stiff beam 20 and the track frame 11 of the point C to D, then the track frame 11 would be pulled inwardly and out of line whenever the stiff beam 20 moved about its pivot A from its CA right angle position.

The point marked E is the center of the pivot 37 secured to the track frame 11 and as explained before is the starting point in locating the pivot 38 and in determining the length of the link 30. The point marked F is the center of the pivot 38 mounted on the stiff beam 20. The pivot E lies closer to the main frame center line AA than the pivot F. The pivot E, being integral with the track frame 11, must move in a plane EE parallel to the plane AA. The pivot point F, being mounted on the stiff beam 20, will move in an arc J described by the stiff beam 20 as it pivots about the pivot A. The dash line EF represents the length of the drag link 30 between the pivot centers E and F. To prevent confusion the letters E and F are used in Figs. 5 and 6 to denote the position of those points at the maximum deflection from normal, and the positions of the same points when the stiff beam 20 is at right angles to the plane AA (Fig. 4) are denoted by the letters E' and F'.

The best instruction I can give at the moment to the man in this art to enable the invention to be practiced is to locate the pivot point E in as close as convenient to the main frame 10. Once point E has been selected, the problem is to locate point F, which will give the length of the drag link 30. I determine what is to be the maximum rise and fall of the track frame 11 relative to the main frame 10 in the vicinity of the stiff beam pad 26. In the illustration, this is about 12 inches, or 6 inches above the line CA and 6 inches below it. This gives me a point H to which the pad 26 will rise, which point H will be necessarily the same rise as the point E. I draw the line HA. This means then that the pivot E must move vertically along the line EE while the point F, in going to and from F' to F, moves in an arc J. What has to be determined, therefore, is the length of the radius FA which will produce a line from F to E which is equal to the line from F' to E'. Or, stated in another way, the point F has to be found. I do this by swinging a series of trial concentric arcs P, Q, R, S, etc., from the center A crossing the lines CA and HA. I then take dividers and measure the distance from the point E' to each arc P, Q, R, S, etc. and, using that distance etc. as respective radii, I strike a series of trial concentric arcs p, q, r, s, around the center E which intersect the arcs P, Q, R, S, etc. I continue to strike trial arcs from A and corresponding arcs from E until I obtain an intersection of the arcs that lies along the line HA. In Figs. 4–6 this was the arc J. This arc J gives the point F as the intersection and coincidence of the two arcs and the line HA, and this also locates the point F' on the line CA and gives the length EF for the drag link 30. In other words, I have thus found a length of line EF which is the same as the length of the line E'F'.

In describing the above, I have referred only to the travel of the point E above the line CA, because the travel of the point E below the line CA, and of the corresponding point E on the other side of the tractor, will be the same.

As a result of determining the location of the pivot 38 along the stiff beam 20 and from it the critical length of the drag link 30 any vertical movement of the track frame 11 will necessarily move the ball connection 37 and the pad 26 the same vertical distance either up or down. Because the distance from E' to F' is the same as from E to F, the drag link 30 will be effective in holding the track frame 11 and the main frame 10 in parallel vertical planes during relative movement. As a result, great strengthening of the track frames is assured and the axle 15 does not have to provide the sole support for the track frames.

It will be noted that this structure can be safely exposed to the elements since the stiff beam's contact with the rest pad 25 is out of the way and the two pivot connections 37, 38 to the drag link 30 are up out of the way. Also, the stiff beam 20, the drag link 30, the rest pad 25, and the pivotal connections 37, 31 and 38, 32 may be made as rugged as needed. Thorough testing has shown this solution to the problem to have long life and few servicing troubles.

Figure 7:
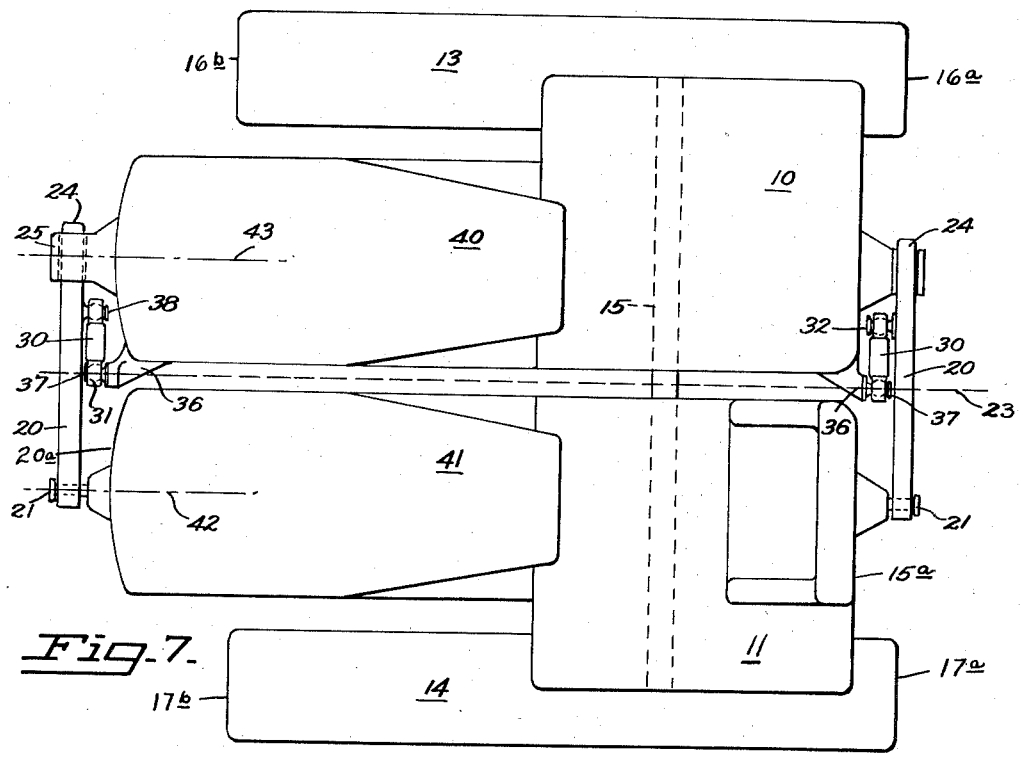
Fig. 7 is a top plan view of my invention as applied to connect twin tractors, having two independent engine-driven chassis pivotally connected one to the other.
Figure 8:
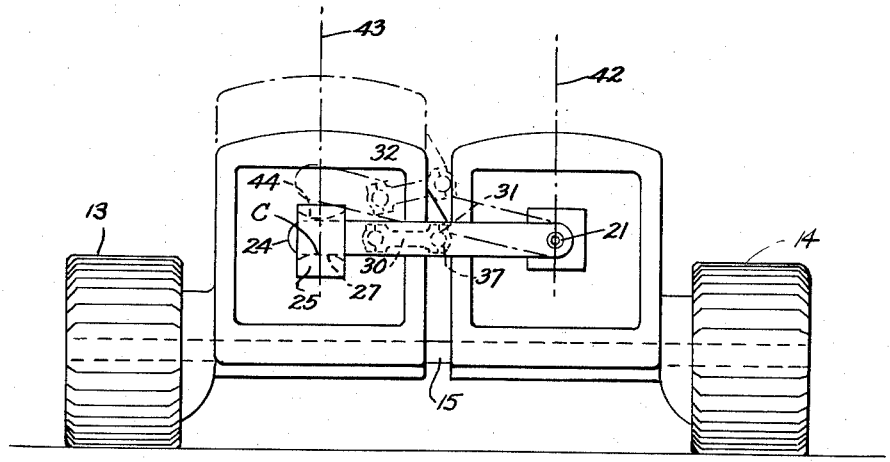
Fig. 8 is a view in front elevation of the device of Fig. 7.
Figure 9:
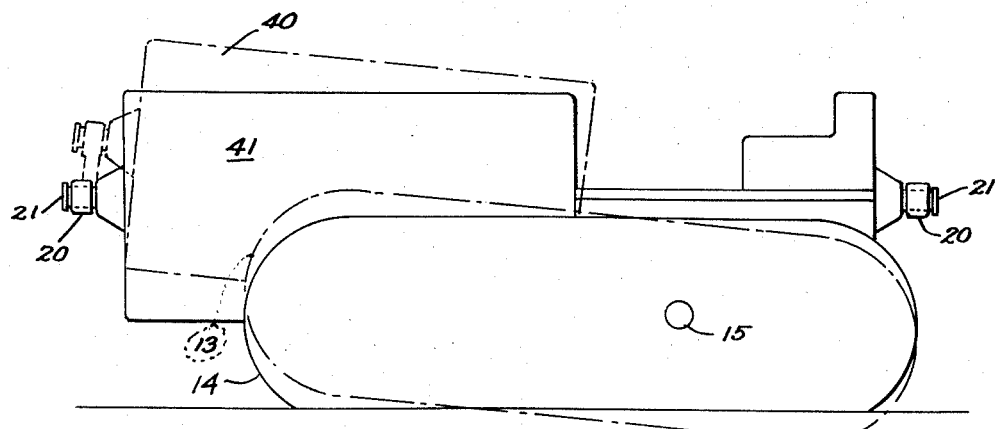
Fig. 9 is a diagrammatic view in side elevation of the device of Fig. 7, showing in dotted lines how one chassis can move relative to the other about their common pivotal connection, but omitting the details of the front and rear connecting means.

In Figs. 7, 8 and 9 I have illustrated my invention as applied to a twin-tractor-type vehicle employing two independent and complete engine-driven chassis, each using only one track. Such a vehicle is shown in my Patent No. 2,678,105, where the two chassis were rigidly secured to each other. The present invention connects the two chassis 40, 41 by a horizontally disposed shaft 15 so that the chassis 40 and its track 13 can move about the pivot 15 in a vertical plane parallel to a like plane passing through the fore and aft center line of the chassis 41. Such movement occurs when the tracks 13 and 14 are working on uneven ground. The problem is to make certain that at all times one chassis moves in a parallel relation to the other chassis as an uneven terrain moves them in their respective vertical planes 42, 43.

In this type of installation the stiff beam 20 is pivoted at one end to a bearing 21 secured to the frame of the chassis 41, preferably along its center line 42. On the corresponding center line 43 of the chassis 40 is secured the pad 25, having an upper covering pad 44 spaced and shaped to permit a suitable sliding and pivoting motion to the end 24 of the stiff beam 20.

In the drawing I have shown a stiff beam 20 at the forward and rear ends of the twin chassis 40, 41 as that is the preferred structure, but only one may be used, in which case it is best to locate it on the end farthest from the shaft 15. Here this would be at the front end.

On the end of the chassis 40 a frame extension 36 is secured, provided with a ball pivot member 37 that fits in the socket-shaped bearing opening 31 in the drag link 30. A ball-shaped bearing member 38 is secured to the stiff beam 20 on the same side of the vehicle's center line 23 as the chassis 40, and it is engaged by the bearing opening 32 in the drag link 30. The drag link 30 thus acts to join the stiff beam 20 to the chassis 40 and functions with the stiff beam to maintain the necessary alignment of the chassis 40, 41 to cause them to move in true vertical planes 42, 43 in respect to each other. The matter of determining the length of the drag link 30 and locating the pivot point 38 is as described heretofore and will not be repeated.

In operation, what occurs is that if the front of the chassis 41 rises in relation to the front of the chassis 40, the stiff beam 20 on the front end will slope downwardly to the left and will slide in the pads 25, 44. The pivot 37 on chassis 40 will move downwardly but in a plane parallel to a vertical plane normal to shaft 15, passing fore and aft through the chassis 41. This is because the drag link 30 has a predetermined length as already explained. The like parts on the rear of the chassis 40, 41 will move in opposite directions, with the pivot 37 moving upwardly in a plane parallel to a vertical plane (normal to the shaft 15) passing fore and aft through the chassis 41.

While in the descriptions I have shown pads 25 and 44 to be engaged by the stiff beam 20, any other kind of joint may be used that will permit movement of the stiff beam relative to the tracks in the case of Fig. 1 or relative to the chassis 40 in the case of Fig. 8, and at the same time will secure the stiff beam 20 in a substantially fixed vertical position on the track frames 11 and 12 or on the chassis 40. This may comprise a roller or a link extending generally vertically in place of the pads.

To those skilled in the art to which this invention relates, other changes in construction and differing embodiments and applications of the invention will suggest themselves without departing from the spirit and scope of the invention. The disclosures and the description herein are purely illustrative and are not intended to be in any sense limiting.

I claim:

1. A track-type tractor having a main frame, track frames, each pivoted near one end to opposite sides of said main frame near one end thereof so that portions at the other end of each said track frame are vertically movable by being free to rise and fall in a vertical plane parallel to a vertical plane passing through the longitudinal center line of said main frame, said tractor being characterized by having the other end of said main frame supported on the vertically movable portions of said track frames at said other end by a stiff beam secured to move in a generally vertical plane on a horizontal pivot on said main frame center line and extending sidewise outwardly over the adjacent portion of each of said track frames and by a supporting means providing a sliding contact between said track frames and said stiff beam so the track frames are free to move in a vertical plane without deflection, said beam then tilting; and a drag link adjacent each track frame, each link lying in a plane generally parallel to the plane in which said stiff beam moves; and pivotally connected to said stiff beam and to said track frame, said pivot points on the stiff beam lying outboard of the pivot points on the track frames and the pivot points on the stiff beam being so located thereon that as said beam is caused to rise or fall by movement of the track frames, the distance between each pivot point on the stiff beam and the adjacent pivot point on the track frame will remain constant, whereby said track frames will be held to movement in a vertical plane generally parallel with the vertical plane passing through the center of the main frame, within the tilting range predetermined for said stiff beam.

2. In a track-type tractor having a main frame, a pair of track frames, one on each side of and parallel to said main frame and pivoted near one end to said main frame with the other end free to rise and fall relative to said main frame, the improvement comprising the combination therewith of a stiff beam extending laterally of said main frame and pivotally secured thereto for movement in a vertical plane, the outer ends of said beam resting on pad portions, one on each said track frame, and supported slidably thereon for support of the main frame thereby; and a drag link connecting each said track frame to said stiff beam, each link lying in a vertical plane generally parallel to the vertical plane through which said stiff beam moves, each drag link being connected at a first pivot point adjacent one end to said track frame and at a second pivot point, outboard from said first pivot point, adjacent its other end to said stiff beam, said second pivot point being located thereon where, as said stiff beam swings about its said main frame pivot due to movement of the track frames and therefore the supporting pads, the vertical distance moved by said pad and said first pivot point necessarily being identical, said first point moves substantially vertically parallel to said track frame while said second pivot point moves with said stiff beam, the rigid drag link connection thereby providing support and linkage between said stiff beam and said track frame without substantial wear at said pivot points.

3. In a track-type tractor having a main frame, a pair of track frames, one on each side of and parallel to said main frame and pivoted near one end to said main frame with the other end free to rise and fall relative to said main frame, the improvement comprising the combination therewith of a stiff beam extending laterally of said main frame and pivotally secured thereto for movement in a vertical plane, the outer ends of said beam being slidably mounted on said track frames; and a drag link generally parallel to said stiff beam and connecting each said track frame to said stiff beam, each drag link being connected at a first pivot point to said track frame and at a second pivot point, outboard from said first pivot point to said stiff beam, said second pivot point being so located thereon that said first point moves substantially vertically parallel to said track frame between given maximum limits while said second pivot point moves with said stiff beam.

4. In a self-propelled vehicle the combination of a pair of self-contained power units lying side by side, each of said power units comprising: a frame having therein an independently controlled source of power; and a road-engaging drive means including a frame secured to said power unit frame and extending alongside thereof and connected at one end to said power source; said power unit frames being connected to each other by a transverse, horizontally disposed shaft so that they are free to rotate about said shaft in vertical planes parallel to a vertical plane normal to the axis of said shaft; said frames also being connected to each other at a point spaced away from said shaft by a flexible means, said means including: a stiff beam secured to move in a generally vertical plane on a horizontal pivot mounted on one of said power units, said beam extending sidewise of said vehicle into contact with the other of said power units; supporting means on the last-named power unit to secure said stiff beam thereto so that it may yield to relative sidewise movement but not to vertical movement; a drag link, lying in a plane generally parallel to the plane in which each stiff beam moves, and pivotally connected to said stiff beam and to a horizontal pivot mounted on the one of said power units to which said stiff beam is yieldably connected, said pivot point on the stiff beam lying outboard of the last-mentioned horizontal pivot so that as said beam is caused to rise or fall by relative movement of the power units about the shaft connecting them, the distance between the pivot point on the stiff beam and the horizontal pivot on the adjacent power unit will remain constant, whereby said power units will be held to movement in parallel vertical planes, within the tilting range predetermined for said stiff beam.

5. The device of claim 4 in which there is a plurality of said flexible means connecting said power units.

6. The device of claim 5 in which said flexible means are located on opposite sides of said transverse, horizontally disposed shaft.

7. In a track-type tractor having a main frame, a pair of track frames, one on each side of and parallel to said main frame and pivoted near one end to said main frame with the other end free to rise and fall relative to said main frame, the improvement comprising the combination therewith of a stiff beam extending laterally of said main frame and secured at the center axis thereof on a main pivot for movement in a vertical plane, the outer ends of said beam resting on pad portions, one on each said track frame, and supported slidably thereon for support of the main frame thereby; and a drag link connecting each said track frame to said stiff beam, each link lying in a vertical plane generally parallel to the vertical plane through which said stiff beam moves, each drag link being connected by a ball-and-socket joint at a first pivot point, adjacent one end, to said track frame and by a cylindrical bearing at a second pivot point, outboard from said first pivot point, adjacent its other end, to said stiff beam, said second pivot point being located along said stiff beam axis at a distance from said main pivot which coincides with the intersection of said stiff beam axis by an arc whose center is said first pivot point raised due vertically above the position said first pivot point has when said beam is horizontal, the amount of vertical raising being a given maximum vertical height moved by said pad when said stiff beam swings about its said main frame pivot, the vertical height moved by said pad and the vertical height moved by said first pivot point necessarily being identical, the length of said arc being the span between said first pivot point in its said position when said beam is horizontal and a point on said line at said distance from said main pivot, said intersection being empirically determined to give said intersection after pre-selecting said first pivot point, the rigid drag link connection thereby providing support and linkage between said stiff beam and said track frame without substantial wear at said pivot points.

References Cited in the file of this patent

UNITED STATES PATENTS

| | | |
|---|---|---|
| 2,015,886 | Eberhard | Oct. 1, 1935 |
| 2,150,433 | Eberhard | Mar. 14, 1939 |
| 2,745,503 | Fisher | May 15, 1956 |